(12) United States Patent  (10) Patent No.: US 8,401,910 B2
Burlin  (45) Date of Patent: Mar. 19, 2013

(54) METHOD AND APPARATUS FOR PROVIDING GROUP VOLUME PRICING

(76) Inventor: Joel Burlin, San Diego, CA (US)

(*) Notice: Subject to any disclaimer, the term of this patent is extended or adjusted under 35 U.S.C. 154(b) by 148 days.

(21) Appl. No.: 13/021,736

(22) Filed: Feb. 5, 2011

(65) Prior Publication Data

US 2012/0203650 A1    Aug. 9, 2012

(51) Int. Cl.
*G06Q 30/00* (2012.01)
(52) U.S. Cl. .................. 705/26.1; 705/26.2; 705/26.3
(58) Field of Classification Search .............. 705/26.1, 705/26.2, 26.25, 26.3, 26.35, 26.4, 26.41–26.44, 705/26.5, 26.61–26.64, 26.7, 26.8, 26.81, 705/26.82, 26.9, 27.1, 27.2
See application file for complete search history.

(56) References Cited

U.S. PATENT DOCUMENTS 6,101,484 A * 8/2000 Halbert et al. ............... 705/26.2
6,269,343 B1 * 7/2001 Pallakoff ..................... 705/26.2
7,433,843 B2 * 10/2008 Brightbill ....................... 705/37

OTHER PUBLICATIONS

Simon Lee et al. "Perceived price fairness of dynamic pricing", Industrial Management + Data Systems, v111n4 pp. 531-550, 2011. Retrieved from Dialog File: 15, Acc#: 07574292 on Dec. 27, 2012.*

* cited by examiner

*Primary Examiner* — Naeem Haq
(74) *Attorney, Agent, or Firm* — Thibault Patent Group (57) ABSTRACT

An apparatus and method for selling goods and services. In one embodiment, a method is described that comprises receiving volume pricing information relating to a product or a service and receiving a first predetermined time period indicating a time period that the product or service may be offered for sale. Refined volume pricing information is then calculated from the volume pricing information. The product or service is then offered electronically for sale for a duration as indicated by the first predetermined time period and including the refined volume pricing information associated with the product or service. Purchase orders are received from potential buyers. A final purchase price is then calculated for the product or service based on the number of purchase orders received during the predetermined time period and the refined volume pricing information. Finally, potential buyers are notified of the final purchase price.

14 Claims, 3 Drawing Sheets

METHOD AND APPARATUS FOR PROVIDING GROUP VOLUME PRICING

BACKGROUND

I. Field of Use

The present application relates to the field of consumer purchasing. More specifically, the present application relates to methods and apparatus for selling goods and services to multiple buyers.

II. Description of the Related Art

The buying and selling of products and services online, i.e., e-commerce, has resulted in a vast array of buying schemes that are used to vary the price at which such products and services are sold.

One technique to vary the selling price is volume buying. According to this buying scheme, sellers set one or more fixed prices for their products based on the volume of units that a buyer is willing to purchase. Buyers desiring to purchase products from the seller are each required to pay the same fixed price depending on the volume of units each buyer purchases. If a seller finds that the demand for a given product is greater or less than expected, the seller may later adjust the fixed price per unit of the product to account for such findings. Although the fixed price per unit system provides a simple way for a seller to conduct business with multiple buyers, one drawback of this buying scheme is that it requires each individual buyer to purchase multiple quantities of a product or service to obtain a discounted price. For example, a seller may offer a toy for sale at $10, or $8 if a quantity of 100 are sold to a single buyer. Purchasers willing to buy a few of these toys will not be able to enjoy the discounted price because of the large number of purchases required to receive the discount. Such potential buyers may become discouraged at such a pricing scheme and decide to shop elsewhere.

Group buying has also become popular. Group buying websites, such as Groupon, provide discounts to a group of buyers if a certain number of products or services are sold within a predetermined time period. However, there is very little flexibility in pricing. If the requisite number of buyers are not found, the product or service simply expires, and no purchases are made at any price.

It would be desirable if a purchasing scheme were available that offers volume discounts to groups of buyers using a more flexible pricing approach.

SUMMARY

The embodiments described herein relate to methods and apparatus for selling goods and services. In one embodiment, a method for selling goods and services is described, the method comprising receiving volume pricing information for a product or service by a server and receiving a first predetermined time period indicating a time period that the product or service may be offered for sale. Refined volume pricing information is then calculated from the volume pricing information. The product or service is then offered electronically for sale for a duration as indicated by the first predetermined time period and including the refined volume pricing information associated with the product or service. Purchase orders are received from potential buyers. A final purchase price is then calculated for the product or service based on the number of purchase orders received during the predetermined time period and the refined volume pricing information. Finally, potential buyers are notified of the final purchase price.

In another embodiment, a processor-readable medium having processor-usable instructions stored thereon for execution by the processor to perform a method is described, comprising receiving volume pricing information for a product or service by a server and receiving a first predetermined time period indicating a time period that the product or service may be offered for sale. Refined volume pricing information is then calculated from the volume pricing information. The product or service is then offered electronically for sale for a duration as indicated by the first predetermined time period and including the refined volume pricing information associated with the product or service. Purchase orders are received from potential buyers. A final purchase price is then calculated for the product or service based on the number of purchase orders received during the predetermined time period and the refined volume pricing information. Finally, potential buyers are notified of the final purchase price.

In yet another embodiment, an apparatus for selling goods and services is described, comprising a storage device for storing a set of processor-readable instructions, for storing volume pricing information relating to a product or service, for storing refined volume pricing information relating to the product or service, and for storing a first predetermined time period indicating a time period that the product or service may be offered for sale. The apparatus further comprises a communication interface for receiving the volume pricing information and for receiving purchase orders from potential buyers. Further still, the apparatus comprises a processor for calculating refined volume pricing information from the volume pricing information by the server, for electronically offering goods and services for sale for a duration as indicated by the first predetermined time period and including the refined volume pricing information associated with the product or service, for calculating a purchase price based on the number of purchase orders received and the refined volume pricing information, and for notifying potential buyers of a final sales price based on the total number of product or service units sold during a first predetermined time period.

BRIEF DESCRIPTION OF THE DRAWINGS

The features, advantages, and objects of the embodiments presented herein will become more apparent from the detailed description as set forth below, when taken in conjunction with the drawings in which like referenced characters identify correspondingly throughout, and wherein.

DETAILED DESCRIPTION

A dynamic pricing apparatus, method, and processor-readable media is described in detail herein. In the following description, numerous specific details are provided, to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention. It should be understood, however, that the drawings and detailed description thereto are not intended to limit the invention to the particular form disclosed. Rather, the intention is to cover all modifications, equivalents, and alternatives falling within the spirit and scope of the subject invention.

As used herein, the terms "component," "system," "module," "processor," "storage device," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

It should be appreciated that the subject invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD)), smart cards, and flash memory devices (e.g., card, stick). Of course, those skilled in the art will recognize many modifications may be made to this configuration without departing from the scope or spirit of the subject invention.

Figure 1:
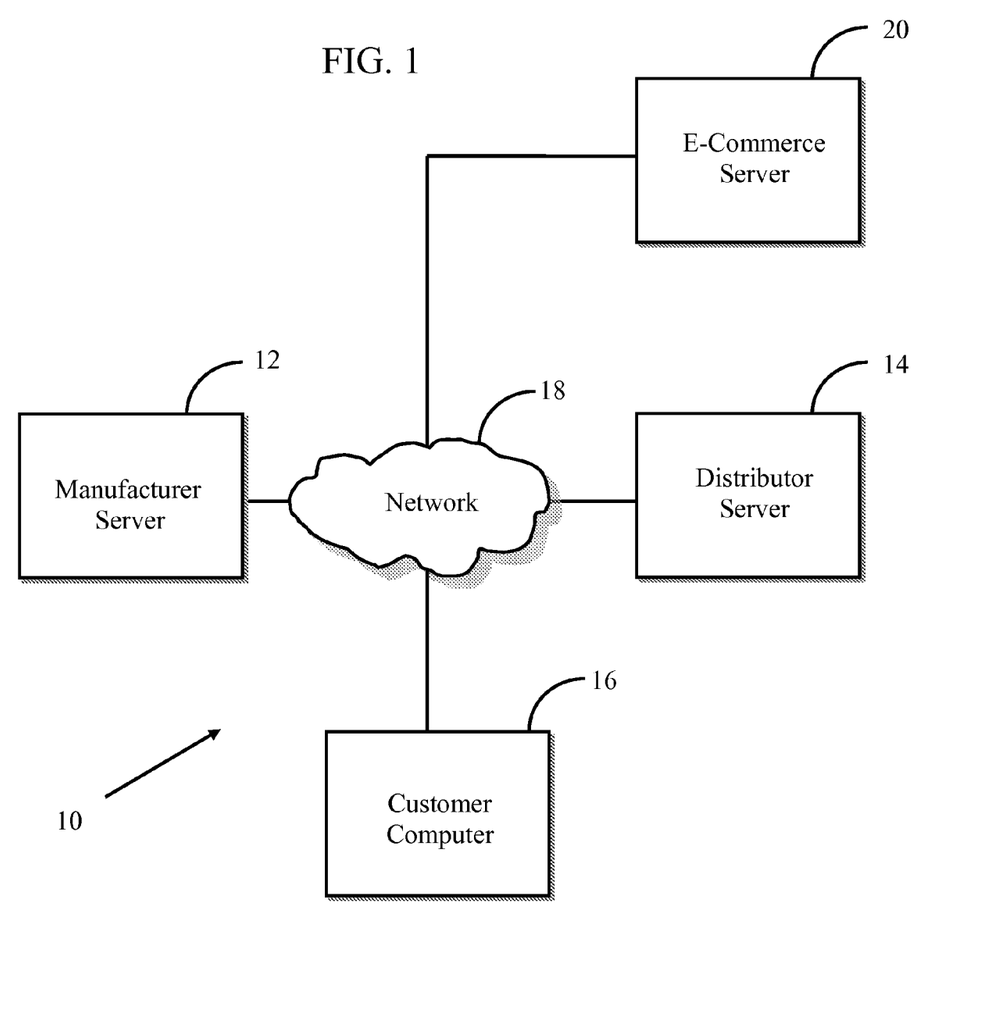
FIG. 1 illustrates a system for e-commerce pricing.

FIG. 1 illustrates a system for e-commerce pricing, generally designated as system 10. In the particular architecture shown, the system 10 may include a manufacturer computer, or server, 12, a distributor computer, or server, 14 and a customer computer 16, which are part of a communication network 18. Communication network comprises one or more of the following: the Internet, a wireless data network, a satellite communication network, a Wi-Fi network, a telephone network, a fiber optic network, etc. While FIG. 1 shows only one manufacturer computer 12, one distributor computer 14, and one customer computer 16, but it is to be understood that many manufacturer computers 12, distributor computers 14, and customer computers 16 could be part of system 10.

FIG. 1 also shows an e-commerce computer, or server, 20 and an administrative interface computer 22 that is in communication with the e-commerce computer 20 and also with manufacturer computer 12, distributor computer 14, and customer computer 16 via the communication network 18. In one embodiment, the computers 12, 14, 16, 20, 22 may be Web servers or personal computers, or the computers 12, 14, 16, 20, 22 may be any computer, including computers sold under trademarks such as AS400, with accompanying IBM Network Stations. Or, the computers 12, 14, 16, 20, 22 may be Unix computers, workstations, or laptop computers, or mainframe computers, or any other suitable computing device. In the preferred embodiment, the computers 12, 14, 16, 20, 22 can communicate with each other through the network 18 via a modem, LAN, WAN, or other network device.

Referring again to FIG. 1, the e-commerce computer 20 comprises the necessary hardware, software, and/or firmware to perform various functions required to carry out e-commerce buying and selling. As shown in FIG. 1, the e-commerce computer 20 can access a database 26 of manufacturer pricing, distributor pricing, e-commerce pricing, product data, as well as other information relating to buyers, sellers, manufacturers, distributors, etc. The pricing information stored in the database 26 can be received from manufacturers, distributors, and/or sellers directly or via the communication network 18.

Figure 2:
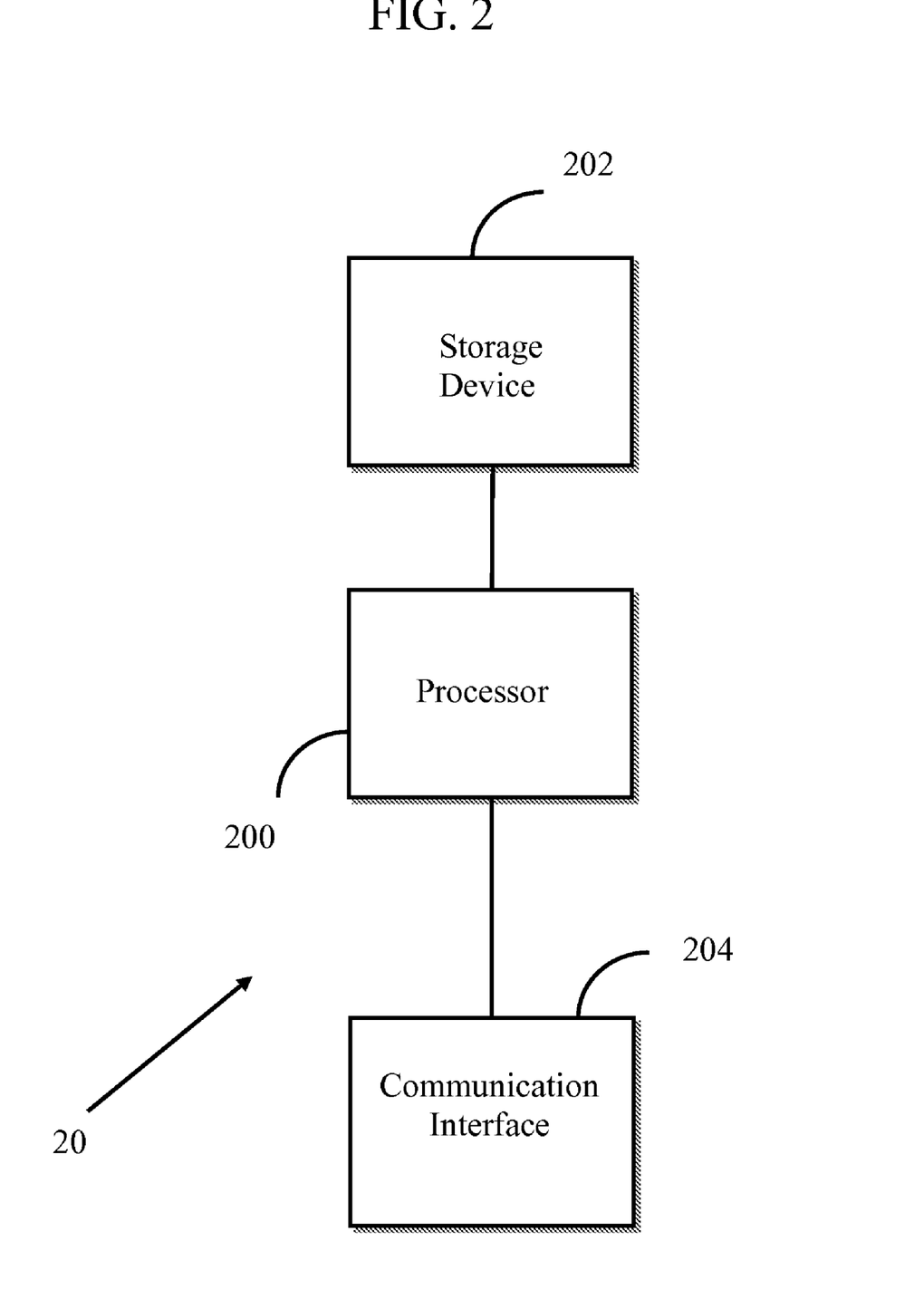
FIG. 2 is a functional block diagram of a server for enabling e-commerce pricing.

FIG. 2 is a functional block diagram of e-commerce computer 20. It should be understood that in some embodiments, not all of the functional blocks will be required to enable the functionality of e-commerce computer 20 and that some functionality has been omitted for clarity.

E-commerce computer 20 comprises a processor 200, a storage device 202, a and a network communication interface 204. A user interface 206 may be present if necessary or desirable to communicate directly with e-commerce computer 20 without using network communication interface 204. E-commerce computer 20 is a computing device such as a personal computer, mainframe computer, application server, web server, or other entity that enable e-commerce between buyers and sellers, distributors, and/or manufacturers, service providers, etc. Processor 200 comprises a general-purpose microprocessor well known in the art or it may comprise a custom or semi-custom ASIC able to carry out the functionality required for stored value exchange. Processor 200 generally executes processor-readable instructions stored in one or more mediums, such as storage device 202, that control most or all of the functionality of e-commerce computer 20. Storage device 202 comprises a processor-readable medium for storing processor-usable instructions for execution by processor 200. Examples of storage device 202 include an electronic memory such as RAM, ROM, hard drives, flash memory, EEPROMs, UVPROMs, etc. Communication interface 204 comprises hardware, software, and/or firmware configured to receive and process communications from various entities connected to one or more communication networks, such as the Internet, a fiber optic network, a radio network, a wired or wireless telephone network, a satellite network, a wired or wireless data network, and/or any other well-known, two-way communication networks.

In one embodiment, manufacturers, distributors, service providers, or other sellers of goods or services may provide e-commerce computer 20 with volume pricing information, comprising quantities and pricing, relating to one or more of their offered goods or services. For example, a first manufacturer could offer a television for sale and be willing to sell one television for a first price, say $1,000. If 10 or more televisions are sold, either within a given timeframe or to a particular individual or group, the manufacturer would be willing to sell the 10th-49th television for a discounted price, for example, $900. Further, the manufacturer could specify that it would be willing to sell the 50th-99th television for a discounted price of $800 for each television. An example of such a price schedule is shown below:

TABLE 1

| Quantity | Price (Each) |
|---|---|
| 1 | $1,000 |
| 10 | $ 900 |
| 50 | $ 800 |
| 100 | $ 700 |
| 500+ | $ 500 |

Each of the prices on the right-hand side of Table 1 comprise "price points" or "price breaks", or "price groups" i.e., a discounted price vs. the previous price point. Volume pricing information can contain a greater, or fewer, price points. For example, in one embodiment, perhaps only 3 price/volume points are defined by a manufacturer. In another embodiment, 7 price points are defined. The volume pricing information is received by communication interface 204, processed by processor 200, and typically stored within storage device 202.

In one embodiment, processor 200 uses the volume pricing information to generate refined volume pricing information. The refined volume pricing information uses the volume pricing information to generate prices for quantities other than what is prescribed in the volume pricing information. For example, using the volume pricing information, above, the refined volume pricing information could determine a price for each TV if, say, 43 TVs were ultimately sold. The refined volume pricing information is generally able to calculate a price for each potential quantity of total sales.

The advantage of using refined volume pricing information is that each successive unit of goods or services sold is given a discount. In other words, using refined volume pricing information allows for a more refined discount mechanism, assigning an increased discount for every unit of goods or services sold.

The refined volume pricing information is typically generated using one or more mathematical formulas that is/are applied to the volume pricing information by processor 200. The mathematical formula(s) is/are typically stored within storage device 202.

In one embodiment, price and volume information is used to calculate a "discount rate" associated with "volume groups" or "price groups". Volume groups may be defined as the number of units that are assigned a given price as provided in the volume pricing information. For example, the first volume group in the volume pricing information chart above are units 1-9, each unit selling for a price of $1,000. The next volume group comprises units 10-49, offered at a price of $900 each. The next volume group comprises units 50-99, offered at a price of $800 each, etc. Each volume group may be identified by the number of units to sell in order to realize the discount in the volume pricing information. For example, volume group 1, above, may be identified by the number "1", volume group 2 may be identified by the number "10", volume group 3 may be represented by the number "50", and so on.

"Price groups" may be similarly defined as a price associated with a number of units for sale. For example, in Table 1, price group $800 is associated with units numbered 50-99.

Each unit of products or services sold is given a greater discount than the previous unit sold. In one embodiment, this is accomplished by calculating a discount rate equal to the difference in price between volume groups divided by the difference in the number of units (or an approximate number of units) between groups. Other variations are possible as well.

Consider a first example. The discount rate for units in volume group 1 (units 1-9) is the difference between the single unit price ($1,000) and the discounted price for the second group (in this case $900), divided by the difference between the number of units in the first volume group (1 unit) and the number of units in the second volume group (10 units). The difference in price is $100 and the difference in units is 9, therefore the discount rate applicable to volume group 1 is 11.1%. In some embodiments, the discount rate may be rounded up or down.

For volume group 2 (units 10-49), the discount rate is equal to 2.5% ($900−$800=$100, divided by 50−10=40). For group 3 (units 50-99), the discount rate is equal to 2% ($800−$700= $100, divided by 100−50=50). For group 4 (units 100-499), the discount rate is equal to 0.5 ($700−$500=$200, divided by 500−100=400).

Consider another example, where the volume pricing information is provided to e-commerce computer 20 as follows:

TABLE 2

| Quantity | Price (Each) |
|---|---|
| 1 | $400 |
| 2 | $360 |
| 10 | $300 |
| 100 | $270 |
| 250+ | $250 |

In this example, a single unit sells for $400, and then price breaks are given when quantities of 2-9, 10-99, 100-249, and 250 plus are sold. The discount rate is calculated similarly as in the first example, above. There is no discount rate for volume group 1 (1 unit), because there is only 1 unit in the group. For volume group 2 (units 2-9), the discount rate is 7.5 ($360−$300=$60, divided by 8). For volume group 3 (units 10-99), the discount rate is 0.333 ($300−$270=$30, divided by 90), and so on.

Once the discount rate has been calculated for the volume groups, a price may be calculated for each unit sold. In one embodiment, the price for each unit is calculated by subtracting the minimum number of units to achieve a price reduction as specified in the volume pricing information from the $n^{th}$ unit sold, multiplied by the discount rate associated with the particular volume group. This number is then subtracted from the price associated with the volume group as provided by the volume pricing information. For example, referring back to Table 1, to calculate the price of the $12^{th}$ unit, the following would be used:

$$\$900-(12-10)*2.5=\$895$$

where $900 is the price listed as the discount price for a quantity of 10 units (i.e., the price associated with volume group 2 in accordance with the given volume pricing information), 12 is the unit number whose price is being determined, 10 is the minimum unit number of volume group 2, and 2.5 is the discount rate, calculated above. According to the formula, the price of the $12^{th}$ unit is $895.

In another embodiment, the price for each unit is calculated by subtracting the number of the unit whose price is being determined from the minimum number of units to achieve a price reduction in a subsequent volume group (as specified in the volume pricing information), multiplied by the discount rate associated with the volume group containing the unit number being evaluated, then added to the price associated with the subsequent volume group as provided by the volume pricing information. For example, referring back to Table 1, to calculate the price of the $12^{th}$ unit, the following would be used:

$$\$800+(50-12)*2.5=\$895$$

where $800 is the price listed as the discount price for a quantity of 50 units (i.e., the price associated with volume group 3 in accordance with the given volume pricing information), 50 is the minimum unit number of the subsequent volume group (volume group 3), 12 is the unit number whose price is being determined, and 2.5 is the discount rate associated with volume group 2, which unit 12 is a part. According to the formula, the price of the $12^{th}$ unit, again, is $895.

A table of prices can be determined for each unit offered for sale, such as the following (only volume groups 1 and 2 shown):

TABLE 3

| Volume Group 1 | | Volume Group 2 | | | | | | | |
|---|---|---|---|---|---|---|---|---|---|
| Quantity | Price | Quantity | Price | Quantity | Price | Quantity | Price | Quantity | Price |
| 1 | 1000 | 10 | 900 | 20 | 875 | 30 | 850 | 40 | 825 |
| 2 | 989 | 11 | 897.5 | 21 | 872.5 | 31 | 847.5 | 41 | 822.5 |
| 3 | 978 | 12 | 895 | 22 | 870 | 32 | 845 | 42 | 820 |
| 4 | 966 | 13 | 892.5 | 23 | 867.5 | 33 | 842.5 | 43 | 817.5 |
| 5 | 956 | 14 | 890 | 24 | 865 | 34 | 840 | 44 | 815 |
| 6 | 945 | 15 | 887.5 | 25 | 862.5 | 35 | 837.5 | 45 | 812.5 |
| 7 | 933 | 16 | 885 | 26 | 860 | 36 | 835 | 46 | 810 |
| 8 | 922 | 17 | 882.5 | 27 | 857.5 | 37 | 837.5 | 47 | 807.5 |
| 9 | 911 | 18 | 880 | 28 | 855 | 38 | 830 | 48 | 805 |
|   |     | 19 | 877.5 | 29 | 852.5 | 39 | 827.5 | 49 | 802.5 |

After the refined volume pricing information is determined by processor 200, it is typically stored in storage device 202.

The examples of calculating the refined volume pricing information, above, essentially use a linear equation to determine prices between given price points and/or volume groups. In other embodiments, the equation that determines the refined volume pricing information could be non-linear, such by an equation that gives some amount of discount to a first number of sales within a volume/price group with an increasing rate of discount given as more sales are registered within the volume/price group. Other non-linear examples are contemplated as well.

At some point, e-commerce computer 20 offers the product or service relating to the volume pricing information and refined volume pricing information that is stored in storage device 202. Typically, this is done by hosting a website that allows people to purchase goods and services online. The website is stored as a series of processor-readable instructions and data that may be stored within storage device 202 or it may reside in some other memory, or even at another computer.

When individuals visit the website via a network communication device such as a computer, wireless device, etc., they are typically provided with a wide variety of goods and services to view and purchase. Goods may include such things as hotel rooms, airline tickets, etc. Services may include such things as recreational activities. When an individual finds a particular good or service that the individual wishes to purchase, the volume pricing information and/or the refined volume pricing information, relating to the good or service, is presented to the individual. Further, the individual may be presented with information relating to a number of the particular product or service that has been purchased already, or that are willing to be purchased. Finally, a time may be displayed, indicating a remaining time that the particular product or service is available for purchase or that the product or service is available to be purchased at a discounted price.

The refined volume pricing information indicates a price at which all buyers will pay for a particular product or service if a cumulative number of goods or services are sold within the given time period. In other words, a product or service may be posted for sale and given a specified time period to attract potential buyers. Each potential buyer indicates an interest in purchasing the product or service and at the end of the time period, the total number of products or services sold is used to determine a final price that all buyers pay. Thus, the more buyers of a particular product or service, the lower the final cost is for all buyers. In other embodiments, a further discount is given to some buyers, as will be discussed in greater detail below. This pricing methodology incentivizes each potential buyer to tell friends, family, co-workers, etc. about the particular product or service, in the hope that they will also commit to purchasing the product or service, thus driving the price down for all buyers.

After the specified time period is over, buyers pay for the product or service using traditional means and then the product or service is provided to each buyer.

Figure 3:
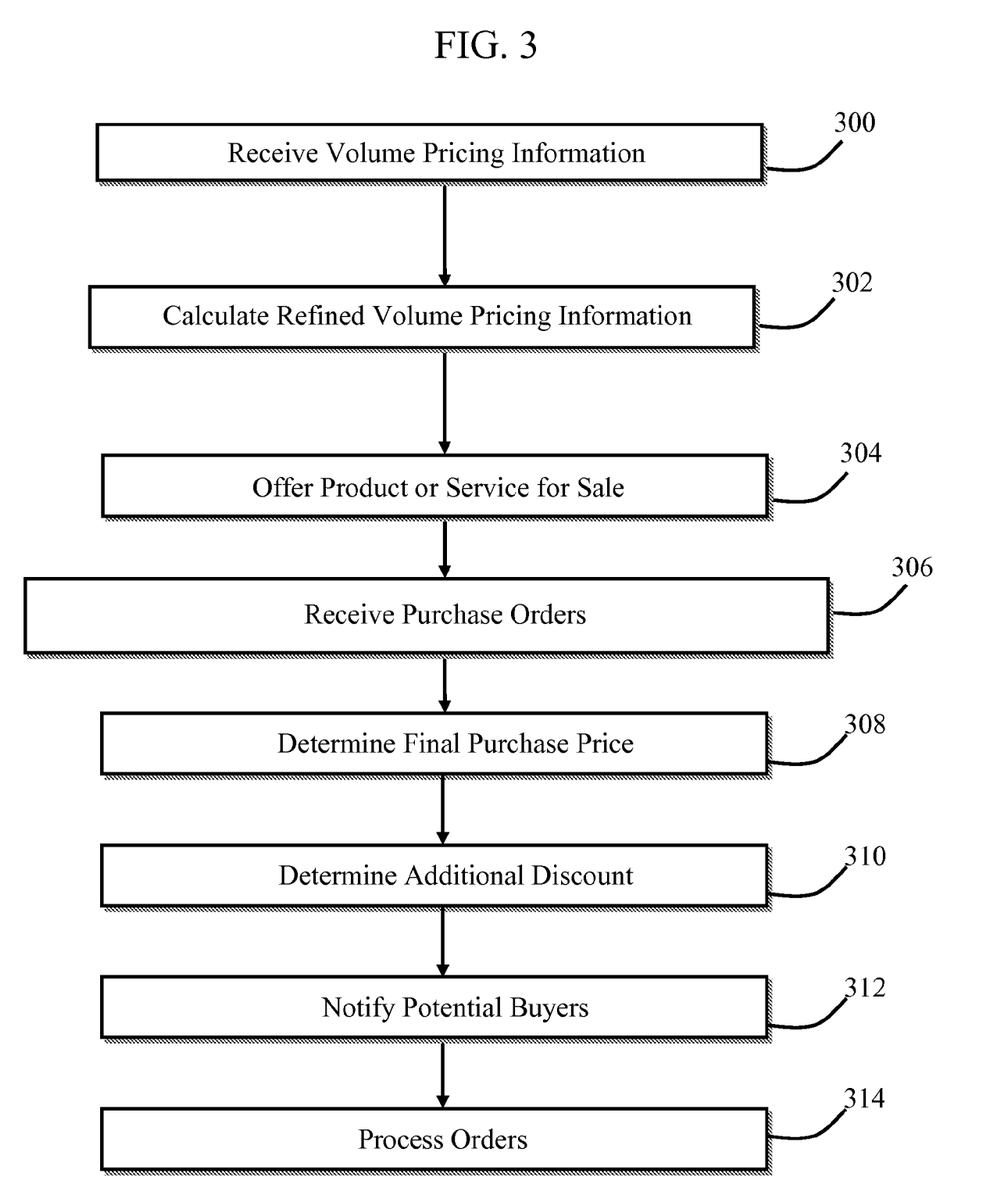
FIG. 3 is a flow diagram illustrating one embodiment for selling goods and using e-commerce pricing.

FIG. 3 is a flow diagram illustrating one embodiment for selling goods and services at a discounted price. The steps shown may be encoding into processor-readable instructions for execution by processor 200.

In step 300, volume pricing information is sent from a manufacturer, distributer, retailer, individual, or other providers of goods or services to e-commerce computer 20, where they are generally received via communication interface 204 and stored in storage device 202.

In step 302, processor 200 calculates refined volume pricing information based on the volume pricing information received in step 300. The refined volume pricing information indicates a final price that all buyers are able to purchase a product or service, depending on how many total purchases are made.

In step 304, a good or a service associated with the volume pricing information and refined volume pricing information is offered for sale, typically on a website hosted by, or for, e-commerce computer 20. The volume pricing information, refined volume pricing information, or both, are displayed to potential buyers of the good or service. As more of the product or service is purchased, the lower the price becomes for all buyers. In addition, a predetermined time period may be shown, indicating an initial time period that the product or service will remain open to purchase and/or when the product or service is available for purchase. An elapsed time may also be shown to potential buyers, indicating the time remaining to purchase the good or service.

The refined volume pricing information may be presented to potential buyers in "raw" form, i.e., provide a price for each potential number of products or services sold, or it may provide the refined volume pricing information in a condensed format.

In step 306, purchase orders are received from potential buyers, typically over a communication network such as the Internet. The term "purchase order" means any indication from a potential buyer that the potential buyer would like to purchase a good or service. Each purchase offer represents a buyer's willingness to purchase the product or service. In one embodiment, at least some of the purchase offers additionally comprise a maximum price that the potential buyer will pay. Thus, if the final price of the product or service does not fall far enough, meeting or exceeding the maximum price, those buyers will not be obligated to purchase the good or service. In this case, the final price for all buyers may increase, due to a change in the total number of purchases of the product or service.

In step 308, a final purchase price is determined for the product or service that was offered for sale. The final purchase price may be determined after a predetermined time period that the product or service was offered expires, or it may be determined after a predetermined number of products or services has been sold. The final purchase price is determined using at least the refined volume pricing information. Processor 200 uses the refined volume pricing information stored in storage device 202 to determine the final purchase price based on the total number of products or services sold in the time period. For example, using the refined volume pricing information shown in Table 3, above, if 48 products or services were sold during the predetermined time period, the final purchase price that each potential buyer will pay is equal to $805. In one embodiment, all potential buyers that have indicated a willingness to purchase the product or service pay the same final purchase price. In another embodiment, some buyers are given an additional discount, as described below in step 310.

In step 310, an additional discount is calculated by processor 200. The additional discount is applied only to potential buyers who have met certain criteria. For example, an additional discount may be given to "early" potential buyers. Early potential buyers are potential buyers who indicated a willingness to purchase the available product or service either within a predetermined time period from when the product or service was initially offered for sale, or that the potential buyers submitted a willingness to purchase the product or service before a predetermined number of potential buyers submitted offers, or both. So, in one example, if 8 potential buyers in the example above submitted a willingness to purchase the product or service within, say 4 hours from when the product or service was first offered, those 8 buyers would be given an additional discount of the final purchase price as calculated in step 308.

In another embodiment, a discount is applied to a potential buyer who refers other potential buyers to submit purchase orders to e-commerce computer 20. In this embodiment, a first potential buyer submits a purchase order relating to the product or service. The first potential buyer notifies his or her friends, relatives, Facebook friends, etc. of the product or service for sale and encourages them to also submit a purchase order for the product or service. If any of these people submit purchase orders to e-commerce computer 20 and further indicate that they were referred to the website by the first potential buyer, the first potential buyer will receive a discount of the final purchase price calculated in step 308. The amount of the discount for the first potential buyer may be increased as more and more potential buyers submit offers for the product or service and indicate that they were referred by the first potential buyer. Of course, any potential buyer is eligible for this "referral" discount if they, in turn, bring other potential buyers to submit purchase orders for the product or service in consideration, i.e., "friends of friends", "friends-of-friends-of friends," etc. In addition, in one embodiment, any buyer who purchases more than one of the same product or service may be eligible to receive a "referral" discount. Processor 200 keeps track of these referrals and calculates a discount for any potential buyer having one or more referrals.

In another embodiment, both the "early" and "referral" discounts may be applied to any potential buyer who is early to submit an offer and, in addition, refers one or more people to buy the product or service that the potential buyer has submitted on offer for. In addition, discounts may be applied in "tiers". In other words, for a first number of potential buyers who provide purchase orders, a first discount could be given, and for a second number of buyer who provide purchase orders after the first number of potential buyers, a second discount could be given in an amount less than, equal to, or greater than the first discount. For time-based discounts, any potential buyer who submits a purchase order within a first predetermined time period would receive a first discount of the price calculated in step 308, while any purchaser who submits a purchase order after the first predetermined time period could be eligible to receive a second discount in an amount less than, equal to, or greater than, the first discount.

In step 312, the buyers are notified of the final purchase price, and those buyers who received an additional discount are provided their discounted final price as well. Typically, buyers are notified via a personal device coupled to communication network 18, or they may be notified in other ways commonly known in the art.

In step 314, buyers typically provide payment for the product or service, either through e-commerce computer 20 or directly to a merchant, distributor, manufacturer, service provider, etc. The product or service is then provided to each buyer.

The methods or steps described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention can include a computer readable media embodying a code or processor-readable instructions to implement the methods of operation of the kiosk in accordance with the methods, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A method for selling goods and services, comprising:
  receiving volume pricing information for a product or service by a server;
  receiving, by the server, a first predetermined time period indicating a time period that the product or service may be offered for sale;
  calculating refined volume pricing information from the volume pricing information by a computer server assigning a refined price to a product or service based on a total number of product or service units sold during the predetermined time period;

electronically offering goods and services for sale for a duration as indicated by the first predetermined time period and including the refined volume pricing information associated with the product or service;

receiving purchase orders from potential buyers;

calculating a final purchase price for the product or service based on the number of purchase orders received during the predetermined time period and the refined volume pricing information; and notifying potential buyers of the final purchase price;

wherein the refined price for each potential unit of product or service is based on price and volume information contained in the volume pricing information, and the price and volume information comprises a first price associated with a first volume and a second price based on a second volume and the refined price is based on a difference between the first and second prices, and a difference between the first and second volumes.

2. The method of claim 1, further comprising:
providing a discount of the purchase price to any potential buyer who provides a respective purchase order if the purchase order is received within a second predetermined time period.

3. The method of claim 2, further comprising:
providing a second discount of the purchase price to a second potential buyer if a second purchase order is received after the second predetermined time period.

4. The method of claim 1, further comprising:
providing a discount of the purchase price to any potential buyer who refers at least one other potential buyer to submit a purchase order for the product or service.

5. The method of claim 1, further comprising:
providing a discount of the purchase price to a potential buyer who is one of the first buyers, out of a first predetermined number of buyers, to submit a purchase order.

6. The method of claim 5, further comprising:
providing a second discount of the purchase price to a second potential buyer if the second potential buyer is one of a second predetermined number of buyers who provide a purchase order after the first predetermined number of potential buyers have submitted purchase offers.

7. The apparatus of claim 1, further comprising:
providing a discount of the purchase price to a potential buyer who is one of the first buyers, out of a first predetermined number of buyers, to submit a purchase order.

8. A non-transitory, processor-readable medium having processor-usable instructions stored thereon for execution by a processor to perform a method comprising:
receiving volume pricing information for a product or a service by the processor;
receiving, by the processor, a predetermined time period indicating a time period that the product or service may be offered for sale;
calculating refined volume pricing information from the volume pricing information by the processor assigning a refined price to a product or service based on a total number of product or service units sold during a predetermined time period;
electronically offering the product or service for sale for a duration as indicated by the first predetermined time period and including the refined volume pricing information associated with the product or service;
receiving purchase orders from potential buyers;
calculating a final purchase price based on the number of purchase orders received during the predetermined time period and the refined volume pricing information; and notifying the potential buyers of the final purchase price; wherein
the refined price for each potential unit of product or service is based on price and volume information contained in the volume pricing information, and the price and volume information comprises a first price associated with a first volume and a second price based on a second volume and the refined price is based on a difference between the first and second prices, and a difference between the first and second volumes.

9. The processor-readable medium of claim 8, further comprising:
providing a discount of the purchase price to any potential buyer who provides a respective purchase order if the purchase order is received within a predetermined time period.

10. The processor-readable medium of claim 9, further comprising:
providing a second discount of the purchase price to a second potential buyer if a second purchase order is received after the first predetermined time period.

11. The processor-readable medium of claim 8, further comprising:
providing a discount of the purchase price to any potential buyer who refers at least one other potential buyer to submit a purchase order for the product or service.

12. The processor-readable medium of claim 8, further comprising:
providing a discount of the purchase price to a potential buyer who is one of the first buyers, out of a first predetermined number of buyers, to submit a purchase order.

13. The processor-readable medium of claim 12, further comprising:
providing a second discount of the purchase price to a second potential buyer if the second potential buyer is one of a second predetermined number of buyers who provide a purchase order after the first predetermined number of potential buyers have submitted purchase offers.

14. An apparatus for selling goods and services, comprising:
a storage device for storing a set of processor-readable instructions, for storing volume pricing information relating to a product or service, for storing refined volume pricing information relating to the product or service; and for storing a first predetermined time period indicating a time period that the product or service may be offered for sale;
a communication interface for receiving the volume pricing information and for receiving purchase orders from potential buyers;
a processor for calculating refined volume pricing information from the volume pricing information by assigning a refined price to a product or service based on a total number of product or service units sold during the predetermined time period, for electronically offering goods and services for sale for a duration as indicated by the first predetermined time period and including the refined volume pricing information associated with the product or service, for calculating a purchase price based on the number of purchase orders received and the refined volume pricing information, and for notifying potential buyers of a final sales price based on the total number of product or service units sold during a first predetermined time period; wherein
the refined price for each potential unit of product or service is based on price and volume information contained in the volume pricing information, and the price and volume information comprises a first price associated with a first volume and a second price based on a second volume and the refined price is based on a difference between the first and second prices, and a difference between the first and second volumes.

* * * * *